US008884882B2

(12) United States Patent
Shimizu

(10) Patent No.: US 8,884,882 B2
(45) Date of Patent: Nov. 11, 2014

(54) MOBILE EQUIPMENT WITH DISPLAY FUNCTION

(75) Inventor: Saki Shimizu, Saitama (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 1573 days.

(21) Appl. No.: 12/023,332

(22) Filed: Jan. 31, 2008

(65) Prior Publication Data

US 2008/0186285 A1 Aug. 7, 2008

(30) Foreign Application Priority Data

Feb. 2, 2007 (JP) ................................ 2007-023708

(51) Int. Cl.
*G06F 3/041* (2006.01)
*G09G 5/00* (2006.01)
*G06F 3/0488* (2013.01)
*G06F 3/0481* (2013.01)

(52) U.S. Cl.
CPC .......... *G06F 3/04817* (2013.01); *G06F 3/0488* (2013.01)
USPC ........................................ 345/173; 345/156

(58) Field of Classification Search
USPC ............ 345/156–183, 104; 178/18.01–20.04; 715/716–726
See application file for complete search history.

(56) References Cited

U.S. PATENT DOCUMENTS

| | | | | | |
|---|---|---|---|---|---|
| 5,678,034 | A | * | 10/1997 | Chew | 345/520 |
| 5,848,429 | A | * | 12/1998 | McEntee et al. | 715/255 |
| 5,910,802 | A | * | 6/1999 | Shields et al. | 715/808 |
| 7,434,177 | B1 | * | 10/2008 | Ording et al. | 715/862 |
| 7,489,307 | B2 | | 2/2009 | Tanaka et al. | |
| 7,742,857 | B2 | * | 6/2010 | Iwamoto et al. | 701/36 |
| 2003/0025676 | A1 | * | 2/2003 | Cappendijk | 345/173 |
| 2003/0184815 | A1 | * | 10/2003 | Shiki et al. | 358/453 |
| 2004/0212617 | A1 | * | 10/2004 | Fitzmaurice et al. | 345/440 |
| 2004/0217947 | A1 | * | 11/2004 | Fitzmaurice et al. | 345/183 |
| 2005/0134578 | A1 | | 6/2005 | Chambers et al. | |
| 2006/0072028 | A1 | | 4/2006 | Hong | |
| 2006/0087520 | A1 | * | 4/2006 | Ito et al. | 345/660 |
| 2006/0103751 | A1 | | 5/2006 | Lee | |
| 2006/0274944 | A1 | | 12/2006 | Tanaka et al. | |
| 2007/0115382 | A1 | * | 5/2007 | Fukuma et al. | 348/333.06 |

(Continued)

FOREIGN PATENT DOCUMENTS

| | | |
|---|---|---|
| JP | 9-282134 | 10/1997 |
| JP | 2003-191567 | 7/2003 |

(Continued)

OTHER PUBLICATIONS

Mac 101: The Dock, Dec. 18, 2009; pp. 1-4.*

(Continued)

*Primary Examiner* — Patrick F Marinelli
(74) *Attorney, Agent, or Firm* — Greenblum & Bernstein P.L.C.

(57) ABSTRACT

A piece of mobile equipment has a display processor that displays an image and at least one icon on a screen, and a touch-sensitive device disposed on said screen. The display processor displays input information in accordance with an input operation to said touch-sensitive device, and removes the icon on the screen in accordance with the input operation.

8 Claims, 5 Drawing Sheets

(56) References Cited

U.S. PATENT DOCUMENTS

| | | | |
|---|---|---|---|
| 2007/0157089 A1* | 7/2007 | Van Os et al. | 715/702 |
| 2007/0195170 A1 | 8/2007 | Yamamoto et al. | |
| 2007/0196101 A1 | 8/2007 | Maeda | |
| 2008/0036868 A1 | 2/2008 | Furumochi | |
| 2008/0049119 A1 | 2/2008 | Yamamoto | |
| 2008/0122796 A1* | 5/2008 | Jobs et al. | 345/173 |

FOREIGN PATENT DOCUMENTS

| | | |
|---|---|---|
| JP | 2006-080916 | 3/2006 |
| JP | 2006-343856 | 12/2006 |
| JP | 2006-352670 | 12/2006 |
| KR | 10-2006-0029353 | 4/2006 |
| KR | 10-2006-0055644 | 5/2006 |

OTHER PUBLICATIONS

Welcome to Tiger, Apple, 2005, pp. 1-32.*
Add movie titles and credits in Windows Movie Maker, Windows, Dec. 2, 2010, pp. 1-2.*
Windows Vista Fact Sheet, Windows, Jan. 2007, pp. 1-4.*
English language Abstract of JP 2003-191567.
English language Abstract of JP 2006-352670.
U.S. Appl. No. 12/016,292 to Shimizu, filed Jan. 18, 2008.
Japan Office action, dated May 10, 2011 along with an english translation thereof.
Japan Office action, dated Sep. 6, 2011 along with an english translation thereof.
Korean Office action, dated Dec. 12, 2013.
Taiwanese Office Action Dated Oct. 7, 2013, with an English language translation thereof.

* cited by examiner

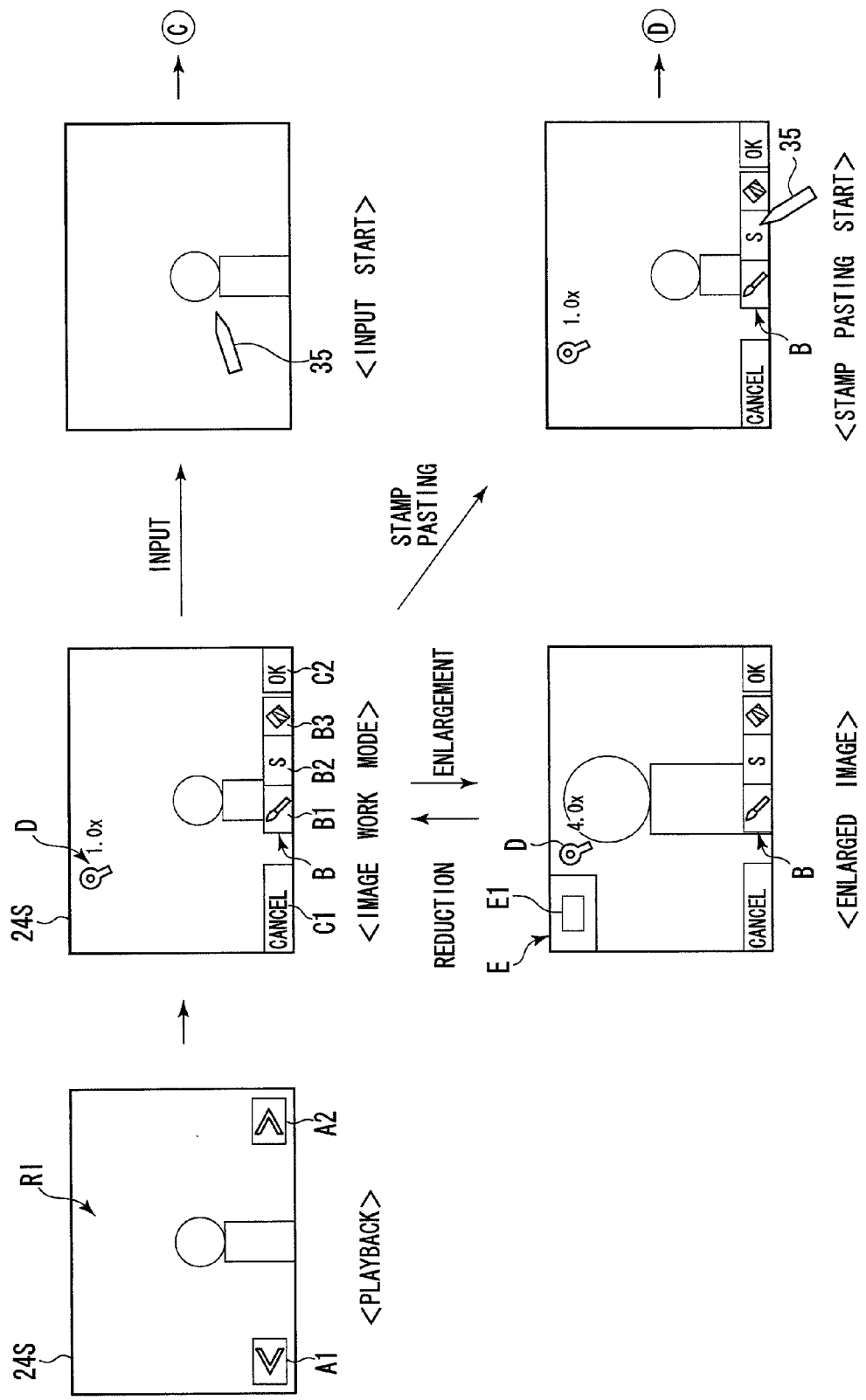

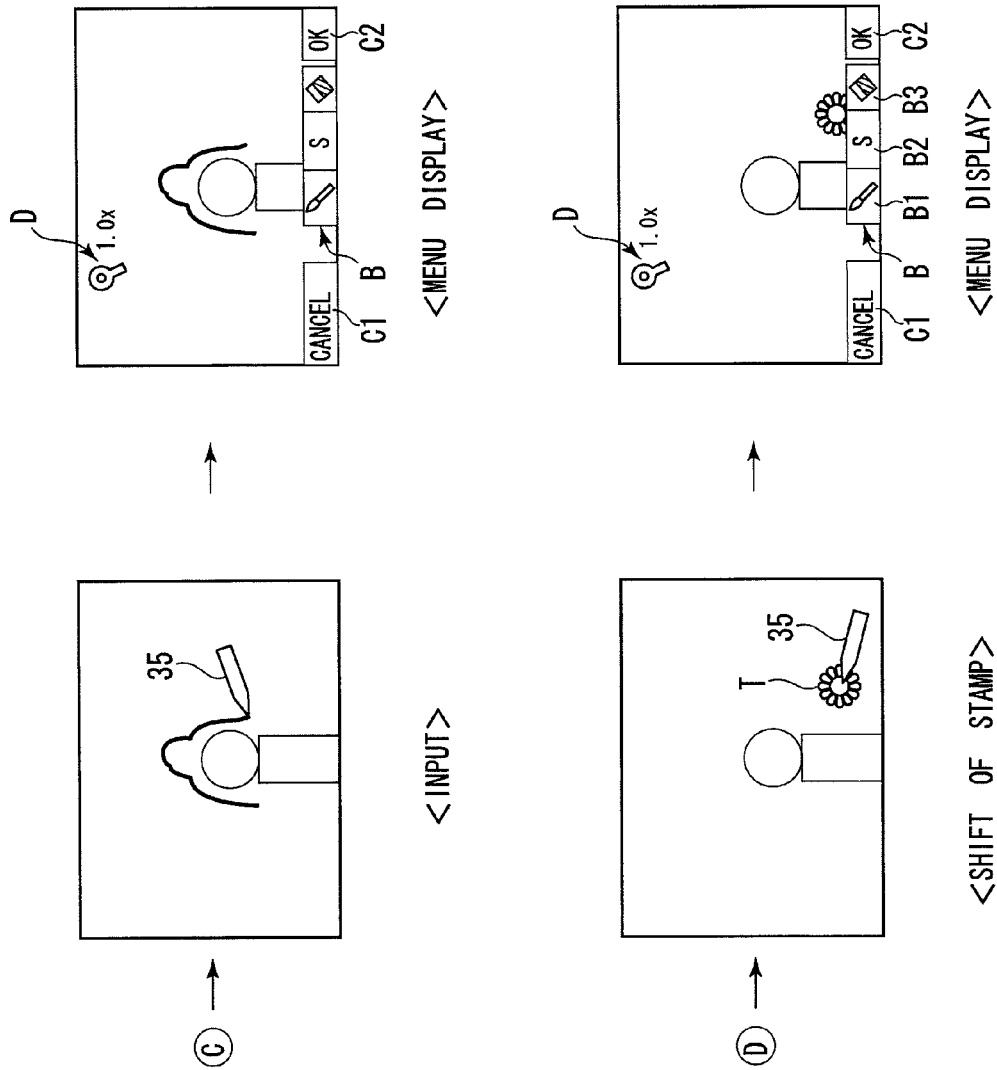

MOBILE EQUIPMENT WITH DISPLAY FUNCTION

BACKGROUND OF THE INVENTION

1. Field of the Invention

The present invention relates to mobile electronic equipment, such as digital cameras, cell phones, PDAs (Personal Digital Assistants), and image viewers, that is capable of displaying characters and drawings together with an image. In particular, it relates to an image-editing process.

2. Description of the Related Art

In mobile equipment with image editing functions, characters and drawings may be superimposed on a displayed image by the user's input operation, and the edited image is recorded or printed out. For example, a touch screen is provided on an LCD monitor as an input device, and the user writes and draws on the touch screen using a stylus. Usually, a tool bar, composed of a series of icons, is displayed on the monitor so that the user can select a line type, stamp type, etc., by touching a given icon with the stylus. The display area of the toolbar grows as editing functions increase, so that the are a available for writing decreases. Since mobile equipment has very limited display are, the user cannot write or draw freely over an entire image.

On the other hand, in the popular amusement arcade photo booths, in which a tool bar is not displayed on the monitor during image-editing. The user can edit a photograph freely. The toolbar is displayed only on depressing a button attached to the stylus. However, in this case, the user must remember many tool functions and consider how to use an editing tool when the tool bar is not displayed.

SUMMARY OF THE INVENTION

An object of the present invention is to provide mobile equipment that is capable of effectively displaying information related to the image editing process while allowing free editing of the entirety of a displayed image.

Mobile equipment according to the present invention has a display processor that displays an image and at least one icon on the screen, and a touch-sensitive device disposed over the screen. For example, an icon for setting photographing functions and a mode, and for editing a photographic image is displayed. When a playback mode is changed to an image-editing mode, the icon is superimposed on the image. Also, an enlargement and reduction processor for enlarging and reducing an image may be provided. In this case, the display processor may display a position-indicating icon that indicates the position of the displayed image area within the overall image.

In the present invention, the display processor displays input information in accordance with an input operation to the touch-sensitive device. For example, the input operation indicates a writing, drawing, illustrating, or pasting patterns. The display processor, for example, superimposes the input information and the icon on the image. Then, the display processor removes the icon from the screen in accordance with the input operation. The user views the icons before the input operation, and selects a tool. Then, the user performs the input operation over the whole screen, on which the icon is not displayed, after the input operation begins.

To allow the user to change to a different operation, the display processor may re-display the icon when contact with the touch-sensitive device breaks. For example, the display processor may display the icon after a given period passes after contact with the touch-sensitive device is broken.

To allow the user to select a process associated with a displayed icon, the display processor may maintain the icon on display or switch to a display screen associated with the selected icon when the touch point is within the display area of the selected icon. For example, in the case of pasting a stamp, the display processor may erase the icon when the touch point moves outside the display area of the icon while contact is maintained.

An apparatus for controlling a display process in mobile equipment according to another aspect of the present invention has a first display processor that displays an image and at least one icon on a touch screen in a state that allows input using the touch screen; a detector that detects contact with the touch screen; a second display processor that displays input information in accordance with the input operation; and an erasing processor that removes the icon when contact is detected.

A computer-readable medium that stores a program for controlling the display process in mobile equipment, according to another aspect of the present invention, has a first display-process code segment that displays an image and at least one icon on a touch screen in a state that allows input using the touch screen; a detecting code segment that detects contact with the touch screen; a second display-process code segment that displays input information in accordance with the input operation; and an erasing process code segment that removes the icon when contact is detected.

A method for controlling the display-process in mobile equipment, according to another aspect of the present invention, includes: a) displaying an image and at least one icon on a touch screen in a state that allows input using the touch screen; b) detecting contact with the touch screen; c) displaying input information in accordance with the input operation; and d) removing the icon when contact is detected.

BRIEF DESCRIPTION OF THE DRAWINGS

The present invention will be better understood from the description of the preferred embodiment of the invention set forth below together with the accompanying drawings, in which:

FIGS. 3A and 3B are views showing an editing screen.

DESCRIPTION OF THE PREFERRED EMBODIMENTS

Hereinafter, the preferred embodiment of the present invention is described with reference to the attached drawings.

Figure 1:
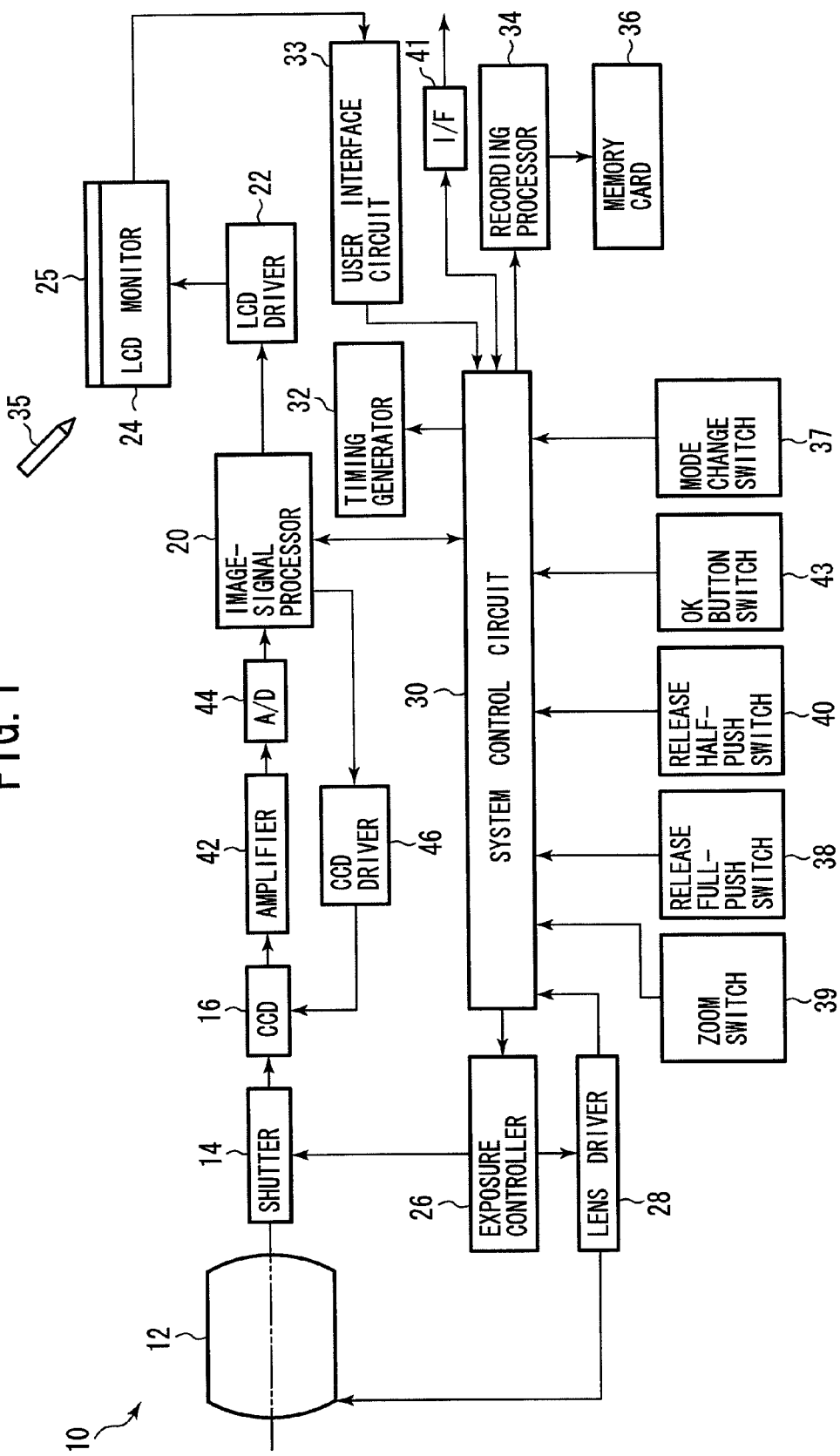
FIG. 1 is a block diagram of a digital camera according to the first embodiment.

FIG. 1 is a block diagram of a digital camera according to the present embodiment.

The digital camera 10 is a compact camera, and a memory card 36 is removably installed into the camera 10. The camera 10 has a system control circuit 30, which includes a CPU, a ROM unit and a RAM unit, and controls the action of the camera 10. The system control circuit 30 connects to a zoom switch 39, a release half-push switch 40, a release full-push switch 38, and an OK button switch 43, and detects an operation signal when the release button, zoom lever, or OK button (not shown) is operated by the user.

Also, the camera 10 has a mode-change button (not shown) for switching mode between the photographing mode and the playback mode. The system control circuit 30 detects a signal from a mode-change switch 37. When the main power button (not shown) is turned on, a photographing operation can be carried out, and the system control circuit 30 controls the photographing process. The program for controlling the camera 10 is stored in the ROM.

When the photographing mode is selected, signal processing for displaying a moving image or live image is performed. An object image is formed on the light-receiving surface of a CCD 16 by light passing through a photographing optical system 12 and shutter 14, so that analog image-pixel signals corresponding to the object image are generated in the CCD 16. The generated image-pixel signals are successively read from the CCD 16 at constant intervals (e.g., $\frac{1}{60}^{th}$—second intervals) by a CCD driver 46, and fed to an amplifier 42. The read image-pixel signals are amplified in the amplifier 42, and are converted to digital image signals in an A/D converter 44.

In the present embodiment, anon-chip color filter method using one color filter is applied. On the light-receiving area of the CCD 16, a primary-color filter, checkered by Red (R), Green (G), and Blue (B) color elements, is arranged such that each area of the three color elements is opposite a pixel.

In an image-signal processor 20, various processes, such as a white-balance adjustment and gamma-correction, are performed on the digital image signals. The processed image signals are temporarily stored in a frame memory (not shown) in the image-signal processor, and are fed to an LCD driver 22. The LCD driver 22 drives an LCD monitor 24, provided on the back surface of the camera 10, on the basis of the image signals. Thus, a moving image is displayed on the LCD monitor 24. A timing generator 32 outputs clock-pulse signals for synchronizing the timing of signal processes in the camera 10.

While displaying a moving image, a focusing controller (not shown) detects the focus condition of the subject, and outputs a control signal to the lens driver 28, so that the focusing lens in the photographing optical system 12 is driven by the lens driver 28 to bring the subject into focus. Also, when the zoom lever is operated by a user while displaying the moving image, an exposure controller 26 outputs a control signal to the lens driver 28 so that the zoom lens in the photographing optical system 12 is driven. The focusing lens is driven accordingly.

When the release button is depressed halfway and the release half-push switch 40 is turned ON, the brightness of the subject and the distance between the subject and the camera 10 are detected in an exposure detector (not shown). Furthermore, an exposure value is calculated in the exposure controller 26. When the release button is fully depressed and the release full-push switch 38 is turned ON, the photographing process to record a still image is carried out. Namely, the shutter 14 is opened for a determined period by a driving signal from the exposure controller 26. Thus, one frame's worth of image-pixel signals corresponding to a single still image are read from the CCD 16, and fed to the image-signal processor 20 via the amplifier 42 and the A/D converter 44.

The one frame's worth of image-signals is subjected to processing in the image-signal processor 20, so that still image data is generated and temporarily stored in the frame memory. In a recording processor 34, the image data is then compressed in accordance with a compression standard such as JEPG, and the compressed image data is recorded in the memory card 36.

A resistive touch screen 25, in which opposing matrix electrodes are arranged between resisters, completely covers the LCD monitor 24. In the image-editing mode, input by the user's finger or a stylus 35 is allowed. A user interface circuit 33 detects the location of a touch on the touch screen 25.

When the user writes characters, or draws on the touch screen 25 using the stylus 35, the user interface circuit 33 detects the contact. The system control circuit 30 outputs a control signal to the image-signal processor 20, and the image-signal processor 20 outputs a driving signal to the LCD driver 24 on the basis of the control signal. Thus, input data is temporarily stored in the frame memory of the image-signal processor 20, and characters or drawings are displayed on the touched locations of the touch screen 25. Input data is updated and stored in the frame memory every time a user writes or draws on the touch screen 25.

In order to change the mode or photographing condition, icons are displayed on the LCD monitor 24 in accordance with the display state. The icons have functions such as those of a setting button or selection button. When the user touches a given icon, the process associated with the touched icon is carried out.

In the playback mode, a recorded photographic image is displayed on the LCD monitor 24. Photographic image data is read from the memory card 36, and is subjected to an expansion process. The restored image data is fed to the image signal processor 20 so that the recorded photographic image is displayed on the LCD monitor 24. The image to be displayed is selected by touching two icons. When the user touches one of the icons, image data associated with the user's operation is read from the memory card 36, and the recorded image is displayed on the LCD monitor 24. Thus, the user can shift a displayed image one by one.

When the user touches the touch screen 25 during the playback mode, as described later, the image-work mode for working on or processing a photographic image, which is one of the image editing modes, is set. In the image-work mode, the user can superimpose characters and drawings on the photographic image using the stylus 35, and can superimpose a stamp (e.g., a flower pattern) on the photographic image. When the zoom lever is operated, a part of the photographic image is enlarged. Thus, the user can write and draw finely. In addition, a stamp mode for creating an original stamp, and a frame mode for creating an original frame can be selected as one of the image-editing modes.

An interface circuit 41 allows the camera 10 to transmit data to peripheral equipment such as a printer. When a given touch operation is performed by the user, image data is transmitted to the peripheral equipment via a signal cable.

Figure 2A:
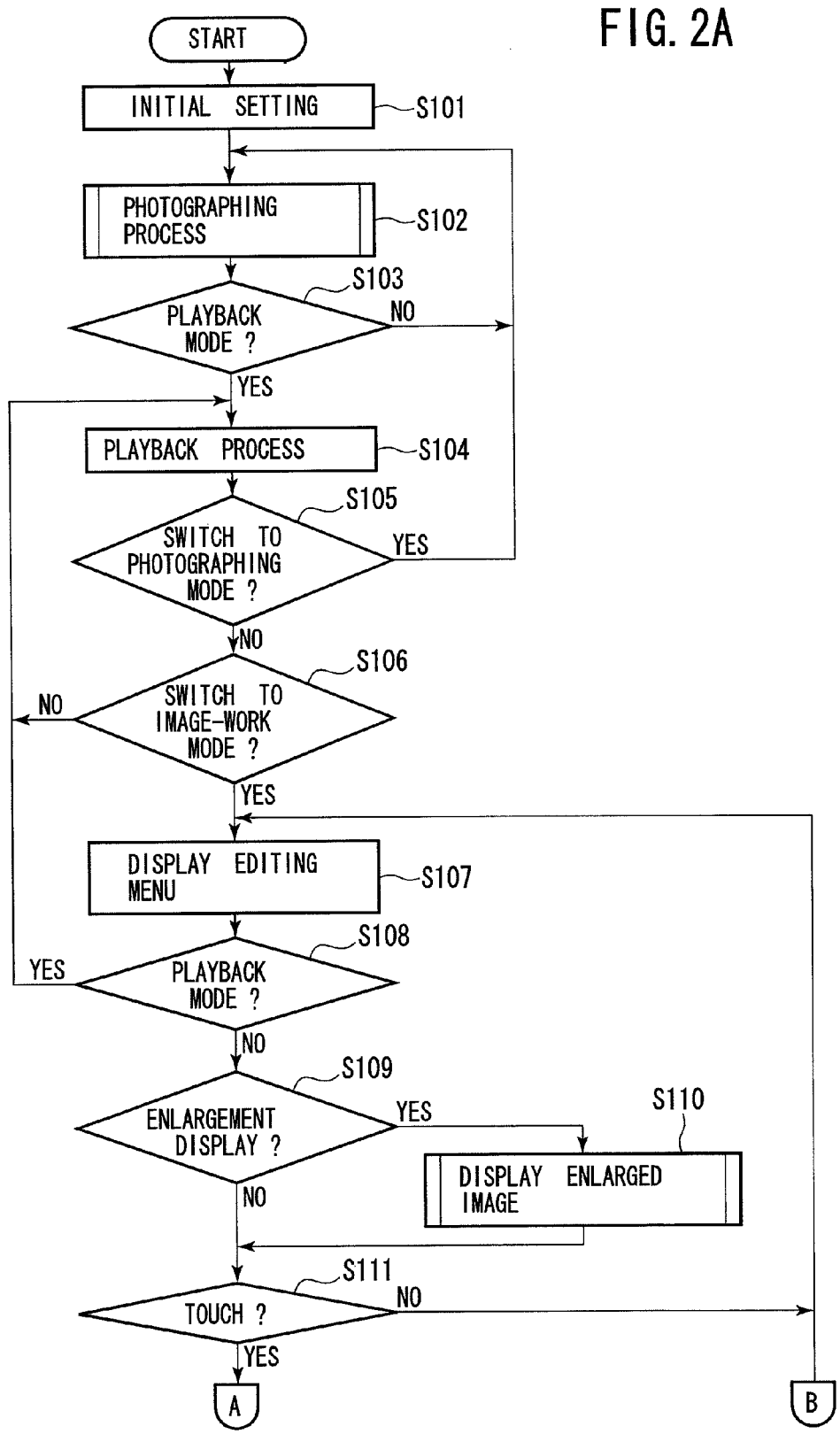
FIGS. 2A and 2B are flowcharts of camera control processes performed by the system control circuit.
Figure 2B:
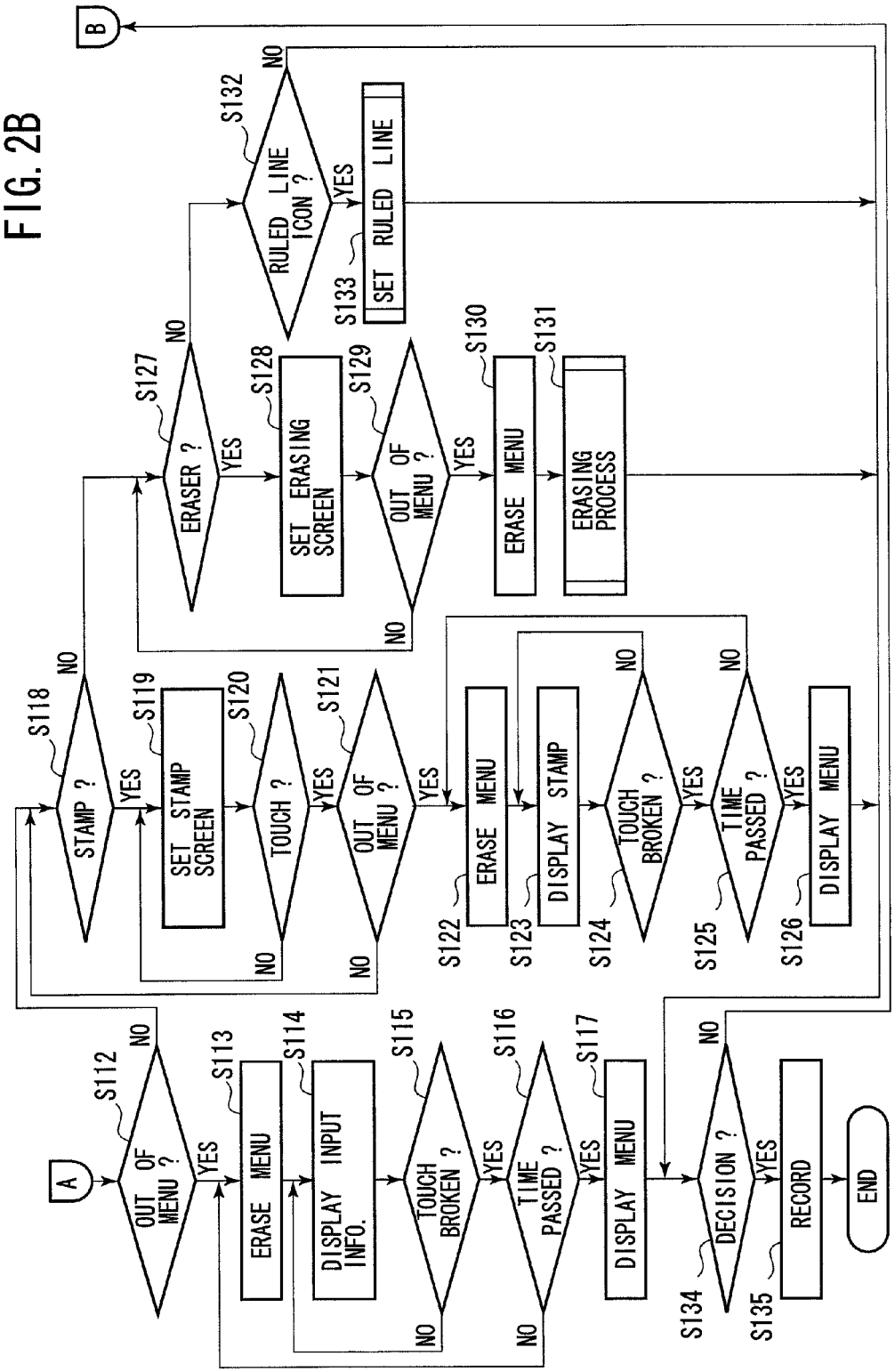

FIGS. 2A and 2B are flowcharts of camera control processes performed by the system control circuit 30. FIGS. 3A and 3B are views showing the display screen in the image-editing mode. When electric power is turned ON, the process is started.

In Step S101, an initialization is carried out on the shutter 14, CCD 16, and each signal circuit. In Step S102, the photographing mode is set so that the photographing optical system 12 extends with the lens barrel, and a moving image is displayed on the LCD monitor 24. In the present embodiment, the photographing mode is set at the same time as electric power is turned on.

In Step S103, it is determined whether the mode-change button has been operated to switch the photographing mode to the playback mode. When it is determined that the mode-change button has been operated, the process goes to Step S104, wherein the playback mode is set and the playback process is carried out. Namely, compressed image data is expanded, and a selected image is displayed on the LCD monitor 24. As shown in FIG. 3A, icons A1 and A3 for changing the playback image are displayed on the LCD monitor 24. The user switches the playback image while depressing the icons A1 and A3.

In Step S105, it is determined whether the playback mode has been switched to the photographing mode. If it is determined that the playback mode has been switched to the photographing mode, the process returns to Step S102. On the other hand, if it is determined that the playback mode has not been switched to the photographing mode, the process goes to Step S106.

In Step S106, it is determined whether an operation for switching the playback mode to the image-work mode has been performed. In the image-work mode, the photographic image can be marked up with a drawing, stamp, note, and illustration, etc., or can be recorded. Herein, the image-work mode is set when a given position on the screen 24S of LCD monitor 24 is touched by the user.

When it is determined that the operation for setting image-work mode has been performed, the process goes to Step S107, in which the editing menu for editing or working on a photographic image is displayed. As shown in FIG. 3A, a tool bar B, composed of a drawing icon B1, a stamp icon B2, and an eraser icon B3, is displayed at the bottom of the LCD monitor 24. Also, a cancellation icon C1 and an OK icon C2 are displayed on opposite sides of the screen 24S, and an enlargement scale icon D is displayed on the upper central part of the screen 24S.

In Step S108, it is determined whether the playback mode has been performed. Herein, the playback mode is set again when the cancellation icon C1 is touched. When it is determined that the cancellation icon C1 has been touched, the process returns to Step S104. On the other hand, when it is determined that the cancellation icon C1 has not been touched, the process goes to Step S109, in which it is determined whether the zoom lever has been operated. Herein, a displayed photographic image is enlarged or reduced by operating the zoom lever provided on the back surface of the camera 10. When it is determined that the zoom lever has been operated, the process goes to Step S110, wherein an enlargement or reduction process is performed.

In FIG. 3A, an enlarged image having four enlargement factors is shown, and total area icon E is displayed in the upper-left corner. The enlargement factor icon D indicates the enlargement factors for an image. When the enlargement factor is 1, the whole photographic image is displayed over the whole of the screen 24S. When the enlargement scale is larger than 1, a part of the photographic image is displayed over the whole of the screen 24S. A position-indicating icon E1 displayed within the icon E indicates the position of the displayed image area. When the user moves the stylus 35 while holding the stylus 35 against the icon E1, the image area shifts in accordance with the location of the touched point. The user can write and draw finely by enlarging the image.

In Step S111, it is determined whether the stylus 35 is touching the screen 24S, that is, whether an input operation for writing and drawing or for attaching a stamp has been performed. Note that the input operation in the image-work mode is herein performed by the stylus 35. When it is determined that the stylus 35 is touching the screen 24S, the process goes to Step S112 in FIG. 2B.

In Step S112, it is determined whether the contact point of the stylus 35 is out of the display area of the editing menu, including the toolbar B and the icons C1 and C2. Namely, it is determined whether an input operation for writing or drawing using the stylus 35 has been performed. Herein, the user can write and draw while the image-work mode is set. When it is determined that the contact point is out of the display area of the tool bar B, the process goes to Step S113, in which all icons, namely, the tool bar B, the enlargement scale icon D, and the OK and cancellation icons C1 and C2 are erased from the screen 24S (see FIG. 3A). In particular, a signal process is carried out in the image-signal processor 20 so as not to display the editing menu. Then, in Step S114, input such as a drawn line is displayed in accordance with the user's input (see FIG. 3B).

In Step S115, it is determined whether the contact by the stylus 35 has broken or stopped, that is, whether the stylus 35 has been removed from the screen 24S. When it is determined that the stylus pen 35 is in contact with the screen 24S, the process returns to Step S114. During the input operation, the series of icons is not displayed on the screen 24S, and characters and drawings input by the user are displayed.

On the other hand, when it is determined at Step S115 that the stylus 35 has been removed from the screen 24S, the process goes to Step S116, in which it is determined whether a predetermined period (herein, 1 second) has passed after the detachment of the stylus 35. Namely, it is determined whether the input operation is ongoing. When it is determined that the predetermined period has not passed, the process returns to Step S113. The editing menu is not displayed and characters and drawings may continue to be input.

On the other hand, when it is determined at Step S116 that the predetermined period has passed, namely, that the input operation has stopped, the process goes to Step S117, in which the editorial menu is displayed (see FIG. 3B). The user may perform an input operation again, or perform different operation, such as a change of ruled line, a stamp pasting, etc. After Step S117 is carried out, the process goes to Step S134.

On the other hand, when it is determined at Step S112 that the stylus 35 touches the display area of the image editorial menu, in other words, that the contact point is in the tool bar B or the icons C1 or C2, the process goes to Step S118. In Step S118, it is determined whether the contact point is within the icon B2, namely, that the stamp pasting has been selected. A flower pattern stamp can thereby be superimposed on the image.

When it is determined that the contact point is in the icon B2, the process goes to Step S119, in which a display for stamp pasting is set. Thus, the user can place a flower pattern stamp at a desired position by using the stylus 35. As shown in FIG. 3A, the editing menu is displayed while the contact point is within the icon B2.

In Step S120, it is determined whether the stylus 35 is in contact with the screen 24S. When it is determined that the stylus 35 is not in contact with the screen 24S, the process returns to Step S119. On the other hand, when it is determined that the stylus 35 is touching the screen 24S, the process goes to Step S121, in which it is determined whether the contact point is beyond the area of the tool bar B including the icon B2. Namely, it is determined whether the operation for pasting the stamp has been performed. When it is determined that the contact point is within the area of the tool bar B, the process returns to Step S118. On the other hand, when it is determined that the contact point is beyond the area of the icon B2, the process goes to Step S122.

In Step S122, the display of the editorial menu is removed. Then, in Step S123, the stamp T is displayed in accordance with the contact point of the stylus 35 (see FIG. 3B). In short, when the contact point moves beyond the area of the icon B2 in the condition that the stylus 35 is touching the screen 24S, the series of icons is removed from the screen 24S. While the contact with the screen 24S is continues, only the stamp T is displayed. The performance of Steps S124 to S126 is the same as those of Step S115 to S117 in FIG. 2A. Namely, the editing menu is not displayed until the stylus 35 detaches from the screen 24S and the predetermined period has passed. When the predetermined period has passed, it is determined that the operation for pasting the stamp has ended, and the editorial menu is displayed (see FIG. 3B). After Step S126 is carried out, the process goes to Step S134.

On the other hand, when it is determined at Step S118 that the contact point is within the area of the stamp icon B2, the process goes to Step S127, in which it is determined whether the contact point is within the eraser icon B3. Namely, it is determined whether the operation for erasing input characters and drawings has been performed. When it is determined that the contact point is within the area of the eraser icon B3, the erasing process is carried out (Step S218 to S131). While the user erases the characters and drawings using the stylus 35, the editing menu is not displayed. After Step S131 is carried out, the process goes to Step S134.

On the other hand, when it is determined at Step S127 that the contact point is not within the area of the eraser icon B3, the process goes to Step S132, in which it is determined whether the contact point is within the ruled line icon B1, namely, whether the operation for setting the type of ruled line has been performed. When it is determined that the contact point is within the ruled line icon B1, the process goes to Step S133, in which a ruled-line setting process is carried out. After step S133 is carried out, the process goes to Step S134.

In Step S134, it is determined whether the stylus 35 is touching the OK icon C2, Namely, whether an operation for recording the edited or processed photographic image has been performed. When it is determined that the contact point is not within the OK icon C2, the process returns to Step S107 in FIG. 2A. On the other hand, when it is determined that the contact point is within the OK icon C2, the process goes to Step S135, and the edited image is recorded. Steps S102 to S135 are repeatedly carried out until electric power is turned OFF.

Note that the display process explained above is carried out for other image-editing modes, for example, the mode for making an original stamp, and the mode for making an original frame.

Thus, in the present embodiment, the editing menu including the tool bar B and icons C1 and C2 are displayed on the screen 24S in the image-work mode. When an input operation using the stylus 35 is started, the editing menu is erased from the screen 24S (S113, S122, S130). The user can write and draw using the whole of the screen 24S. Then, when the predetermined period passes after the stylus 35 is removed from the screen 24S, the editing menu is displayed again. Thus, by stopping the input operation, the user can easily review the editing functions, and smoothly change the mode. Furthermore, when the contact point of the stylus 35 is within one of the series of icons, the process associated with the touched icon can be carried out directly.

The input operation in the image-work mode may be performed by a blunt, pointed object or a finger instead of the stylus 35. Icons not associated with image editing functions may also be displayed. Also, an editing menu may be displayed on a screen in which the photographic image is not displayed (e.g., a function setting screen or a note screen). A cell phone, viewer, or a PDA may be used as mobile equipment.

When the input operation stops, the editing menu may be instantly displayed again. Also, the editing menu may be erased when the stylus 35 touches a given icon. Furthermore, the editing menu may also be erased after the stylus 35 is removed from the screen.

Finally, it will be understood by those skilled in the arts that the foregoing description is of preferred embodiments of the device, and that various changes and modifications may be made to the present invention without departing from the spirit and scope thereof.

The present disclosure relates to subject matter contained in Japanese Patent Applications No. 2007-023708 (filed on Feb. 2, 2007), which is expressly incorporated herein by reference, in its entirety.

The invention claimed is:

1. Mobile equipment, comprising:
   at least one display processor that displays an image, at least one icon, and input information on a screen, the at least one icon comprising a stamp icon for attaching a stamp to an image when an image work/image editing mode of the mobile equipment is selected; and
   a touch-sensitive device disposed on said screen;
   wherein said at least one display processor displays said input information in accordance with an input operation to said touch-sensitive device, and removes the stamp icon from the screen in accordance with the input operation, and
   wherein said at least one display processor maintains the stamp icon on the screen when a point of contact for the touch-sensitive device is within a display area of the stamp icon, removes the stamp icon from the screen when the point of contact for the touch-sensitive device is outside the display area of the stamp icon, and removes the stamp icon from the screen when the point of contact for the touch-sensitive device moves outside the display area of the stamp icon while contact is maintained,
   wherein said at least one display processor, when the point of contact for the touch sensitive device moves outside of the display area of the stamp icon, removes the stamp icon from the screen, and displays a stamp at the point of contact for the touch sensitive device, while contact continues in the image work/image editing mode, and
   wherein said at least one display processor displays the stamp icon after removing the stamp icon from the screen when contact with said touch-sensitive device is broken, and displays the stamp icon when a given time period passes after contact with said touch-sensitive device is broken.

2. The mobile equipment of claim 1,
   wherein said at least one display processor switches to a display screen associated with a selected stamp icon when the point of contact is within the display area of the selected stamp icon.

3. The mobile equipment of claim 2,
   wherein the at least one display processor displays a series of icons including said stamp icon,
   wherein the at least one display processor maintains a display of the series of icons when the point of contact is within the display area of the stamp icon, and
   wherein the at least one display processor removes the series of icons when the point of contact moves outside the display area of the stamp icon while contact is maintained, and displays a stamp at the point of contact for the touch sensitive device.

4. The mobile equipment of claim 1, wherein said at least one display processor enlarges and reduces an image, said at least one display processor displaying a position-indicating icon that indicates the position of the displayed image area within the overall image.

5. The mobile equipment of claim 1, wherein said at least one display processor superimposes the input information and the stamp icon on the image when a playback mode is changed to an image-editing mode.

6. An apparatus for controlling the display process of mobile equipment, comprising:
- at least one display processor that displays an image, at least one icon, and input information on a touch screen in a state that allows an input operation using the touch screen, and that displays said input information in accordance with the input operation, the at least one icon comprising a stamp icon for attaching a stamp to an image when an image work/image editing mode of the mobile equipment is selected; and
- a detector that detects contact with the touch screen;
- wherein said at least one display processor maintains the stamp icon on the touch screen when a point of contact for the touch screen is within a display area of the stamp icon, removes the stamp icon from the touch screen when the point of contact for the touch screen is outside the display area of the stamp icon, and removes the stamp icon from the touch screen when the point of contact for the touch screen moves outside the display area of the stamp icon while contact is maintained,
- wherein said at least one display processor, when the point of contact for the touch screen moves outside of the display area of the stamp icon, displays a stamp at the point of contact for the touch screen, while contact continues in the image work/image editing mode, and
- wherein the at least one display processor displays the stamp icon, after removing the stamp icon from the screen, when contact with said touch screen is broken and when a given time period passes after the contact with said touch screen is broken.

7. A non-transitory computer-readable medium that stores a program for controlling the display process of mobile equipment, comprising:
- at least one display-process code segment that displays an image, at least one icon, and input information on a touch screen in a state that allows an input operation using the touch screen, and that displays said input information in accordance with the input operation, the at least one icon comprising a stamp icon for attaching a stamp to an image when an image work/image editing mode of the mobile equipment is selected; and
- a detecting code segment that detects contact with the touch screen,
- wherein said at least one display-process code segment maintains the stamp icon on the touch screen when a point of contact for the touch screen is within a display area of the stamp icon, removes the stamp icon from the touch screen when the point of contact for the touch screen is outside the display area of the stamp icon, and removes the stamp icon from the touch screen when the point of contact for the touch screen moves outside the display area of the stamp icon while contact is maintained,
- wherein said at least one display process code segment, when the point of contact for the touch screen moves outside of the display area of the stamp icon displays a stamp at the point of contact for the touch screen, while contact continues in the image work/image editing mode, and
- wherein the at least one display-process code segment displays the stamp icon, after removing the stamp icon from the screen, when contact with the touch screen is broken and when a given time period passes after the contact with the touch screen is broken.

8. A method for controlling the display-process of mobile equipment, comprising:
- displaying an image, at least one icon, and input information on a touch screen of the mobile equipment in a state that allows an input operation using the touch screen, and displaying said input information in accordance with the input operation, the at least one icon comprising a stamp icon for attaching a stamp to an image when an image work/image editing mode of the mobile equipment is selected;
- detecting contact with the touch screen;
- maintaining the stamp icon on the touch screen when a point of contact for the touch screen is within a display area of the stamp icon, removing the stamp icon from the touch screen when the point of contact for the touch screen is outside the display area of the stamp icon, and removing the stamp icon from the touch screen when the point of contact for the touch screen moves outside the display area of the stamp icon while contact is maintained, and
- removing the stamp icon from the screen when the point of contact for the touch screen moves outside of the display area of the stamp icon, and displaying a stamp at the point of contact for the touch screen, while contact continues in the image work/image editing mode,
- wherein the displaying displays the stamp icon, after removing the stamp icon from the screen, when contact with the touch screen is broken and when a given time period passes after the contact with the touch screen is broken.

\* \* \* \* \*